United States Patent [19]
Lakritz

[11] Patent Number: 5,586,198
[45] Date of Patent: Dec. 17, 1996

[54] METHOD AND APPARATUS FOR IDENTIFYING CHARACTERS IN IDEOGRAPHIC ALPHABET

[76] Inventor: David Lakritz, 1806 Parkwood Dr., San Mateo, Calif. 94403

[21] Appl. No.: 322,683

[22] Filed: Oct. 12, 1994

Related U.S. Application Data

[63] Continuation of Ser. No. 110,875, Aug. 24, 1993, abandoned.

[51] Int. Cl.⁶ .................................................. G06K 9/68
[52] U.S. Cl. ............................................ 382/185; 400/110
[58] Field of Search ...................... 364/419.09; 345/171; 395/150, 151, 155, 157, 159, 161; 382/185; 400/110

[56] References Cited

U.S. PATENT DOCUMENTS

| | | | |
|---|---|---|---|
| 4,251,871 | 2/1981 | Yu | 400/110 |
| 4,670,841 | 6/1987 | Kostopoulos | 395/139 |
| 4,727,511 | 2/1988 | Sekiguchi | 400/110 |
| 4,829,583 | 5/1989 | Monroe et al. | 382/13 |
| 4,937,745 | 6/1990 | Carmon | 364/419 |
| 5,187,480 | 2/1993 | Thomas et al. | 382/13 |
| 5,319,386 | 6/1994 | Gunn et al. | 400/110 |

OTHER PUBLICATIONS

Tan. "Chinese Input Systems with Dynamic Character Composition." Computer Processing of Chinese and Oriental Languages, vol. 4, No. 4, Mar. 1990, pp. 295–303.

Y. Chu, Chinese/Kanji Text and Data Processing, IEEE Computer (Jan. 1985).

J. Becker, Typing Chinese, Japanese, and Korean, IEEE Computer (Jan. 1985).

R. Matsuda, Processing INformation in Japanese, IEEE Computer (Jan. 1985).

R. Walters, Design of a Bitmapped Multilingual Workstation, IEEE Computer (Feb. 1990).

J. Huang, The Input and Output of Chinese and Japanese Characters, IEEE Computer (Jan. 1985).

*Primary Examiner*—Michael T. Razavi
*Assistant Examiner*—Jon Chang
*Attorney, Agent, or Firm*—Michael A. Glenn; Laurie J. Mintz

[57] ABSTRACT

In a computer based approach to looking up characters in an ideographic alphabet, a user specifies characters by dragging individual character radicals from a radical palette to a canvas. A database is searched for characters that match character radicals dragged to the canvas and a selection window is produced that contain a resulting list of matching characters. The search may be limited by specified qualifying parameters, such as the total number of strokes in the character. When a desired character is chosen from a selection window, a unique character code is generated that may be output for various applications.

14 Claims, 9 Drawing Sheets

FIG. 1

METHOD AND APPARATUS FOR IDENTIFYING CHARACTERS IN IDEOGRAPHIC ALPHABET

This is a continuation of application Ser. No. 08/110,875 filed Aug. 24, 1993 now abandoned.

BACKGROUND OF THE INVENTION

1. Technical Field

The present invention relates to symbol recognition and identification. More particularly, the present invention relates to identifying characters in ideographic alphabets.

2. Description of the Prior Art

Chinese, Japanese, and Korean scripts are based on ancient Chinese characters which make up an ideographic alphabet comprising more than 50,000 characters.

The characters of an ideographic alphabet are each composed of simpler, constituent parts known as radicals. Radicals are the building blocks of ideographic characters and combine in certain predetermined ways to form the characters of an ideographic alphabet. Under current practice, a set of 214 radicals is used in various combinations to produce the characters of the Chinese alphabet. Each radical, in turn, is made up a series of specific and precisely defined strokes. There are currently about 40 individual stroke shapes in use which, based on variations in size, require the mastery of 82 strokes before practical writing skills for Chinese ideographs are obtained.

The sheer size of ideographic alphabets presents unique challenges for specifying and identifying individual characters, particularly for data entry and data processing. Various schemes have been proposed and descriptions can be found in the literature. See, for example, Y. Chu, Chinese/Kanji Text and Data Processing, IEEE Computer (January 1985); J. Becker, Typing Chinese, Japanese, and Korean, IEEE Computer (January 1985); R. Matsuda, Processing Information in Japanese, IEEE Computer (January 1985); R. Walters, Design of a Bitmapped Multilingual Workstation, IEEE Computer (February 1990); and J. Huang, The Input and Output of Chinese and Japanese Characters, IEEE Computer (January 1985).

These methods can be divided into five broad categories which are described below.

1. Direct keyboard input.

Direct keyboard input requires a large keyboard in which a user searches for each character or character group and presses one or more keys to generate a code corresponding to the desired character. These types of keyboard based systems are bulky, unwieldy, and are difficult to expand. Additionally, such keyboards are not particularly intuitive. That is, one using a keyboard-based input system for an ideographic alphabet must possess a significant level of familiarity with the alphabet before being trained in the use of the keyboard. There is no efficient way to minimize hand and finger movement during the process of data entry using such keyboards because of the large number of keys and the minimum key spacing necessary. As a result, excessive hand movement, as well as time spent hunting for the desired character means that data input rates using such keyboards by even the most skilled users are only slightly better than those of one skilled in writing ideographic scripts.

2. Phonetic based input.

Phonetic based input may employ either a standard ASCII keyboard on which each of the keys is assigned a unique phonetic symbol value; or it may employ a phonetic code value in which the phonetic values are each assigned a two-character code, where each code is generated by pressing two keys on a standard ASCII keyboard. There may be additional variations on this same basic concept.

There are various implementations of phonetic based input systems but the basic idea is to type a representation for the sound of a character on the keyboard rather than directly inputting it as in the Direct keyboard input method described in the previous section. For example, one such method for Chinese uses a keyboard consisting of 37 phonetic symbols, either directly mapped one symbol per key or through a two character sequence.

Another common method requires the user to specify the character's sound by typing the romanized equivalent of its pronunciation on a standard QWERTY style keyboard.

Because many ideographic characters can have the same sound, character entry in phonetic based systems requires a special module known as a front end processor. The front end processor takes as input the sound of the desired character, typed phonetically on the keyboard, and produces as output, a menu of possible characters having that sound. The user must select the desired character from the menu.

Phonetic based character entry and selection is slow and tedious. Furthermore, this method can only be used if the correct pronunciation of the character is already known.

Examples of front end processors for Japanese input include Wnn (developed by the University of Kyoto), Canna (developed by Software Research Associates), and Clare (developed by the Canon corporation).

As mentioned, a characteristic of ideographic alphabets is that there is usually more than one character for a given pronunciation, and there may be regional variations in the pronunciation of a particular character. There are also very subtle and complex distinctions in language sounds that may not be accurately expressed in a predefined set of phonetic values. Different sets of phonetic symbols would be required to properly represent a particular dialect.

Another problem with these systems is when the pronunciation of a character is not known but it is still necessary to input the character. For example, a translator may need to look up the meaning of an unknown character in an on-line dictionary or glossary without knowing the pronunciation. Phonetic based systems cannot be used in such cases and the translator must stop work and manually look up the character in a dictionary.

3. Attribute based input.

Attribute based input systems associate a unique attribute or set of attributes with each ideograph in the character set. There are many variations on this theme but in its simplest form a unique code is assigned to each character. To access a particular character, its unique code is typed on the keyboard and the character will appear on the display screen. Examples of standard character encoding schemes for ideographic characters include Japanese Information Standard ('JIS'), Shift-JIS, and EUC for Japanese, BIG5 for Chinese, and Unicode which encodes all ideographic alphabets.

A variation on this same theme is to choose attributes that are intuitively easier to remember than numeric codes. For example, any of the number of strokes in the character, the main radical, or the shape of the character could be used to specify a character. Examples of products that use this look-up method are the Wizard Denshi Techou manufactured by Sharp of Japan, and the Casio Wordtank manufactured by Casio of Japan. These are both handheld Japanese character dictionaries that allow the user to specify by menus, several kinds of attributes like those mentioned above. A further example of this approach is MacSunrise developed by Japan Media, a kanji learning tool which accomplishes the same function by clicking on menus and icons with a mouse. Attribute based systems are cumbersome and difficult to use because they are not particularly intuitive. They require knowledge of the attribute itself, which could be difficult for code based systems, or they require an analysis of the character to be looked up followed by a specification of the appropriate attributes, two very different kinds of actions (right brain and left brain) that are not easily mastered.

4. Radical or pattern based input.

One approach to ideographic character identification which divides characters into radicals or similar patterns is based on the Three-Corner Coding Method. This method sorts patterns of strokes into a logical system of 99 major and 201 minor symbols that may be represented in tabular form in a 10×10 square. Each symbol is assigned two numbers which are derived from the vertical axes in the table. The three-corner code for any symbol is determined by entering six digits, which correspond to three of the symbols appearing at three of the desired character's corners. This system has proven reliable for generating unique characters, but is slow and tedious. In operation, one must either memorize all of the six-digit codes, or one must hunt through the table and then enter the six-digit code.

5. Other specialized input methods.

Another method has been proposed in U.S. Pat. No. 4,829,583, Method and Apparatus for Processing Ideographic Characters, issued to Monroe et al, in which a specific sequence of strokes is entered into a 9×9 matrix, referred to as a training square. This sequence is matched to a set of possible corresponding ideographs. Because the matrix senses stroke starting point and stroke sequences based on the correct writing of the ideograph to be identified, this system cannot be used effectively until one has mastered the writing of the ideographic script.

In addition to the foregoing methods of generating and/or identifying ideographic characters, handwriting recognition systems have been proposed, but these systems require the user to be proficient in writing the ideographic characters and are sensitive to variations in individual writing styles; optical character recognition systems have been proposed, but the technology to accomplish optical character recognition for ideographic characters is still very primitive and prone to high error rates. Voice recognition systems have also been proposed but these are still very primitive and the technology is many years away from being practical; it also requires a user conversant in the language represented by the ideographic alphabet. See, for example, R. Matsuda, Processing Information in Japanese, IEEE Computer (January 1985).

So far, all known character encoding, identification, and recognition schemes for ideographic alphabets have all or most of the following flaws:

They are inefficient in terms of keystrokes per character;

They take considerable time and patience to learn;

They make data entry a slow, burdensome, conscious task;

They are limited to a specific alphabet and they are not easily updated nor are they readily exchanged for other alphabets;

They all require previous knowledge and competence with the language underlying the ideographic alphabet.

A simple, fast, easy to use system for generating, identifying, and recognizing characters in ideographic alphabets has been heretofore unknown. Yet such system is needed to provide access to such alphabets for those at all skill levels with the language, written and/or spoken, underlying such ideographic alphabets.

SUMMARY OF THE INVENTION

The present invention is a computer based approach to looking up characters in ideographic alphabets. The present invention, unlike prior art look-up methods, specifies characters by graphically constructing them on a computer screen from a palette of radicals. Typical applications of the present invention include ideographic based word processing, language learning, translation, and desktop publishing.

To build a character using the present invention, individual radicals are dragged from a palette to an on-screen canvas. As many radicals can be dragged to the canvas as the user desires and they can be placed in any area of the canvas and resized to match the desired character. As each radical is placed on the canvas, the invention searches a database for characters that match the specified criteria. Every action on the canvas (dragging, deleting, translating, and resizing) queries the database and brings up a list of matching characters on-screen in a selection window.

The invention includes an on-screen palette that, for applications with the Chinese alphabet, contains a graphical representation of a list of radicals. A windowserver and event handler allow radicals to be dragged on-screen from the palette to a canvas, such that radicals may be arranged by the user to construct a desired ideograph. The ideographic description is maintained in a database that encodes a graphical representation of each character in the character set. A database engine queries the database for relevant data; and an analysis engine correlates the screen images on the canvas with the character descriptions in the database to produce a list of matching characters in a selection window. Thus, the invention provides a display of those characters that most closely match the graphical image drawn on the canvas by the user.

The search can further be limited by specifying qualifying parameters, such as the total number of strokes in the character. When the desired character is chosen from the selection window, the invention produces a unique character code that can then be passed to a word processor or other application program.

The present invention is a graphical system with which a user can build and manipulate characters directly on screen. Accordingly, the present invention provides an intuitive approach that allows the user to draw the character exactly as it appears to the user. The invention allows character look-up without knowledge of the subject ideographic alphabet, and therefore does not require knowledge of obscure attributes of the character. Thus, the invention provides character look-up through a consistent set of right brain actions. Unlike prior art approaches, no special codes or functions need be learned, nor is any writing ability or special knowledge of the ideographic alphabet necessary. As such, the invention is readily used with any ideographic alphabet.

BRIEF DESCRIPTION OF THE DRAWINGS

FIG. 1 shows a kanji palette and a canvas according to the preferred embodiment of the present invention;

DETAILED DESCRIPTION OF THE INVENTION

The present invention is a look-up system for ideographic alphabets that allows the user to graphically describe the character by building it out of its constituent components, or radicals. The preferred embodiment of the present invention is designed for Japanese kanji, but the invention is useful for any ideographic character set (e.g. Chinese, Egyptian hieroglyphs, etc.). The preferred embodiment of the invention provides a kanji look-up system that allows a user who has no prior training or experience with the ideographic alphabet to graphically describe any character in the alphabet by building it out of its constituent components, or radicals. The preferred embodiment of the invention uses a standard and well known set of 82 radicals, shown in FIG. 1.

As shown in the figure, initially there are two elements of the invention visible on-screen: the palette of radicals 10 and the canvas 12 on which the desired character is constructed. A third component, the selection window, shown in FIG. 2, contains a set of characters that most nearly match the kanji constructed on the canvas.

To build a character, individual radicals are dragged from the palette 10 to the canvas 12 by the user. As many radicals can be dragged to the canvas as the user desires. The radicals can be placed on any area of the canvas and resized to match the desired character. There is no predetermined sequence in which the character must be formed, nor is there any requirement that the radical be registered within a matrix or training square.

As each radical is placed on the canvas, the invention searches a database for characters that match the specified criteria. The user queries the invention through a series of on-screen manipulations, including, for example dragging, deleting, translating, and resizing selected radicals on the canvas. Every action on the canvas (dragging, deleting, translating, and resizing) queries the database and brings up a list of matching characters on screen. The search can further be limited by specifying qualifying parameters, such as the total number of strokes in the character.

As the user drags additional radicals to the canvas, constructing a more specific or complete form of the desired character, the number of matches shown in the selection window decreases. The process of constructing the character on the canvas continues until the user is able to choose the desired kanji from the selection window. If the user is able to identify the desired character in the selection window early on, the process of constructing the character need not continue until the entire character is formed. Thus, the invention allows early identification of the desired character. When the desired character is selected from the output window 14 (FIG. 3), the invention produces a unique character code that can then be passed to a word processor or other application program.

Figure 1:
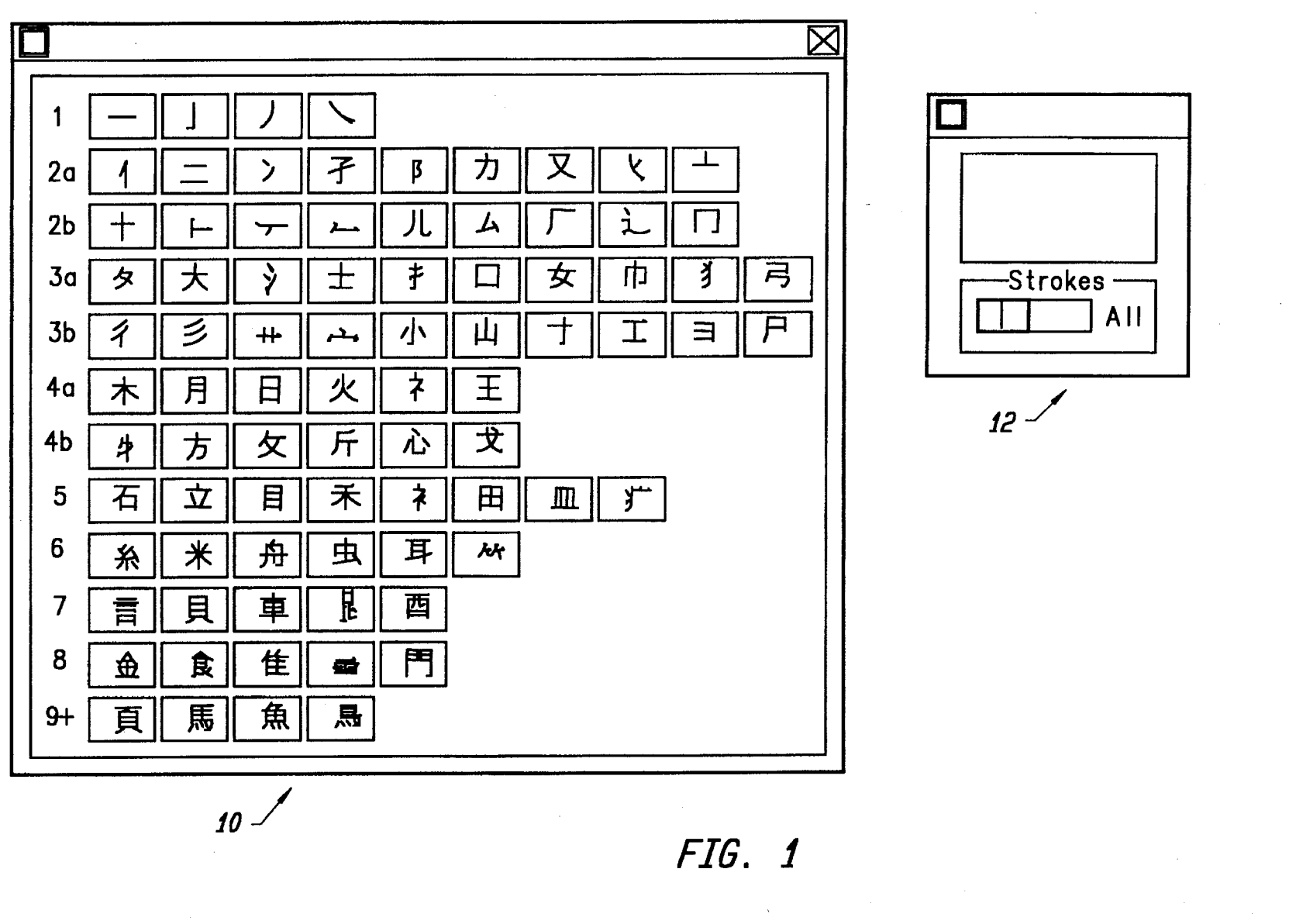
Figure 2:
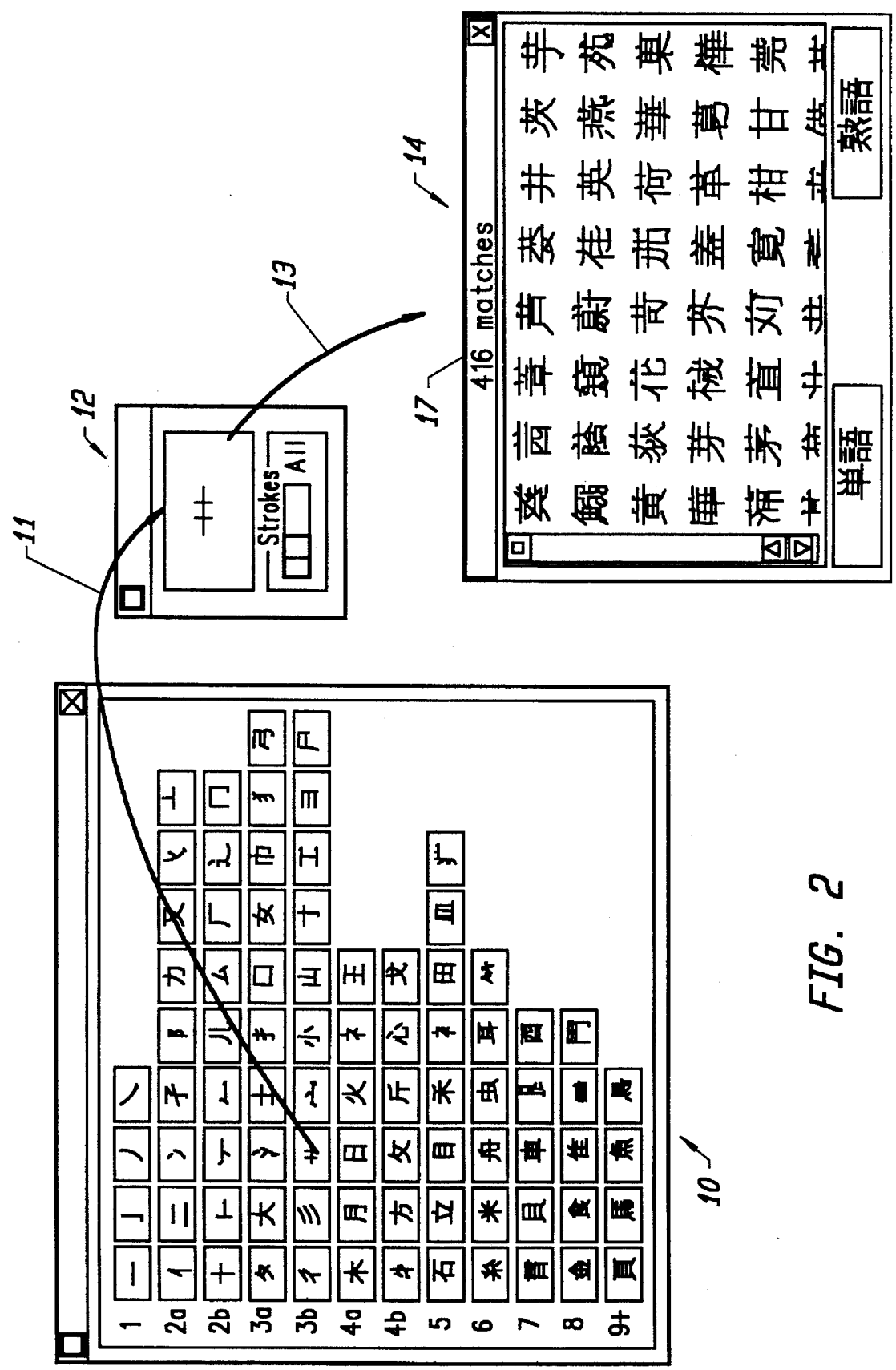
FIG. 2 shows the kanji palette and the canvas of FIG. 1 on which a kanji radical has been dragged from the palette to the canvas, resulting in the display of a corresponding selection window according to the preferred embodiment of the present invention.
Figure 3:
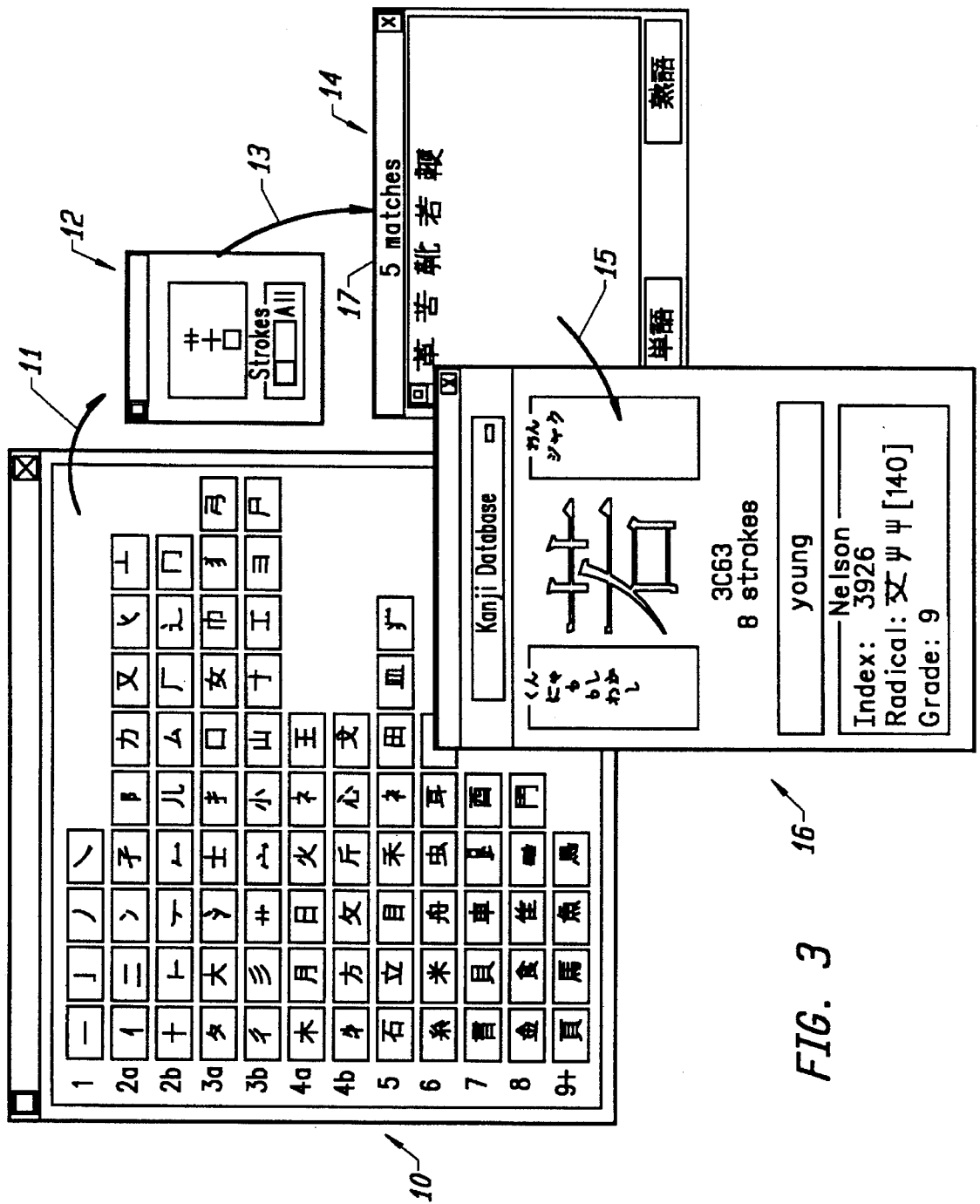
FIG. 3 shows the kanji palette, canvas, and selection window of FIG. 2, including an output window, according to the preferred embodiment of the present invention.

The various actions of drawing and identifying a character are shown in FIGS. 1–3. FIG. 1 shows a kanji palette 10 and canvas 12 according to the preferred embodiment of the present invention.

FIG. 2 shows the kanji palette 10 and canvas 12 of FIG. 1 on which a kanji radical has been dragged from the palette 10 to the canvas 12 (as shown by the arrow identified by numeric designator 11), resulting in the display of a corresponding selection window 14 (as shown by the arrow identified by numeric designator 13). It can be seen in the figure that the selection window 14 indicates that there are 416 matches for the radical that the user has dragged to the canvas. The number of matches is shown in the selection window, as indicated by numeric designator 17.

FIG. 3 shows the kanji palette 10, canvas 12, and selection window 14 of FIG. 2 after additional radicals have been dragged to the canvas to thereby narrow the number of matches displayed in the selection window (in this case, five matches are shown in the selection window). The user selects the desired character from the selection window (in this case the desired character is shown 'highlighted' in the selection window) and the invention displays an output window 16 in which various information about the selected character is displayed, such as the English language definition ("young"), the grade ("9"), or the Japanese pronunciation ("jaku"). This action is shown in FIG. 3 by the arrow identified by numeric designator 15.

It is not necessary to completely draw the character on the canvas 12. Once a minimal set of actions causes the desired character to appear in the selection window 14, the character can be selected for inclusion in a word processor or for use in another application.

Figure 4:
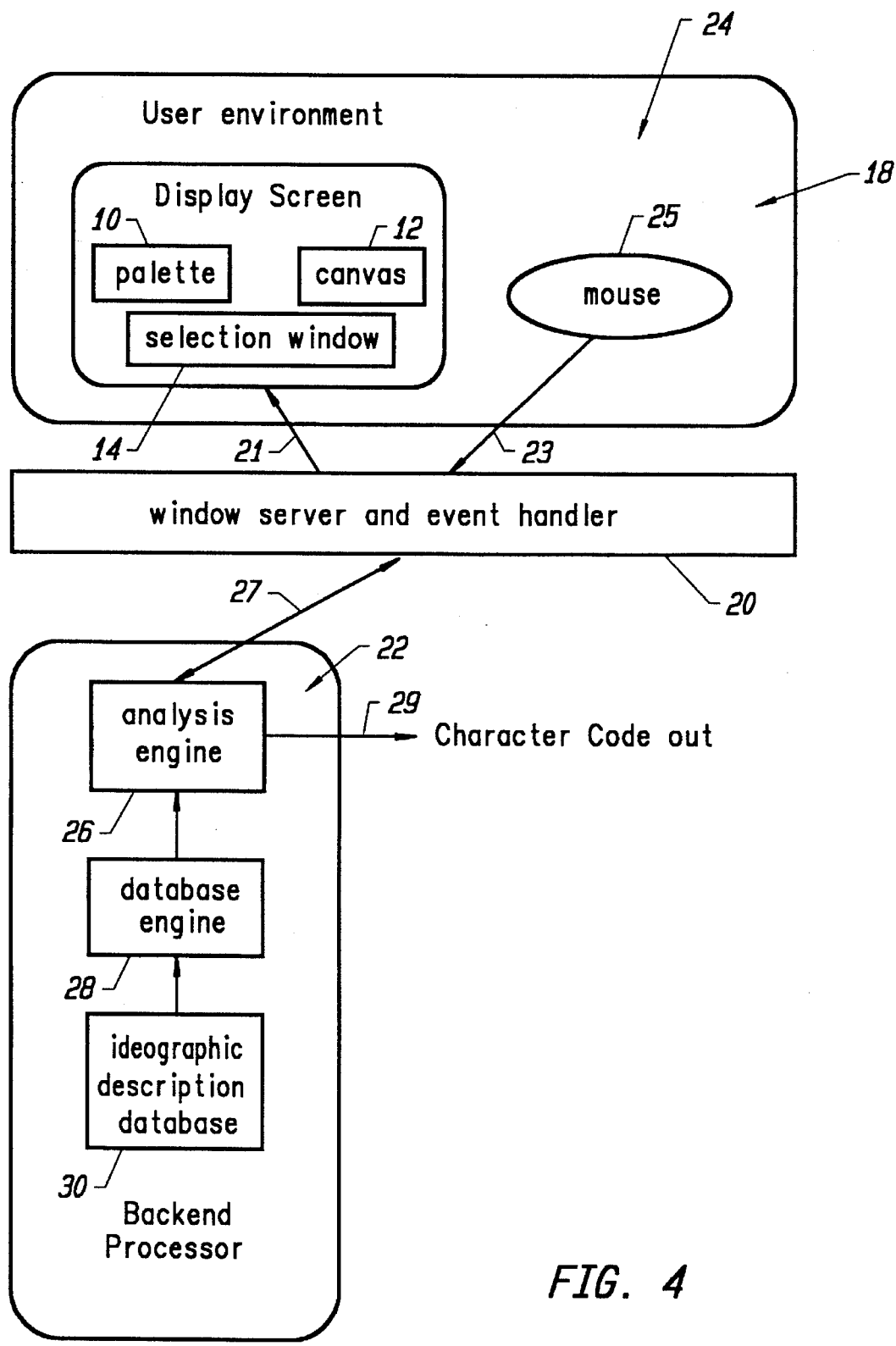
FIG. 4 is a block schematic diagram of the preferred embodiment of the present invention.

FIG. 4 is a block schematic diagram of the preferred embodiment of the present invention. The invention includes a user environment 18, which provides the graphical user interface, including a mouse 25 and a display screen 24; and a backend processor 22, and consists of seven main components:

∞the palette 10;

∞the canvas 12;

∞the selection window 14;

∞the window server and event handler 20;

∞the analysis engine 26;

∞the database engine 28; and

∞the ideographic description database 30.

Figure 5:
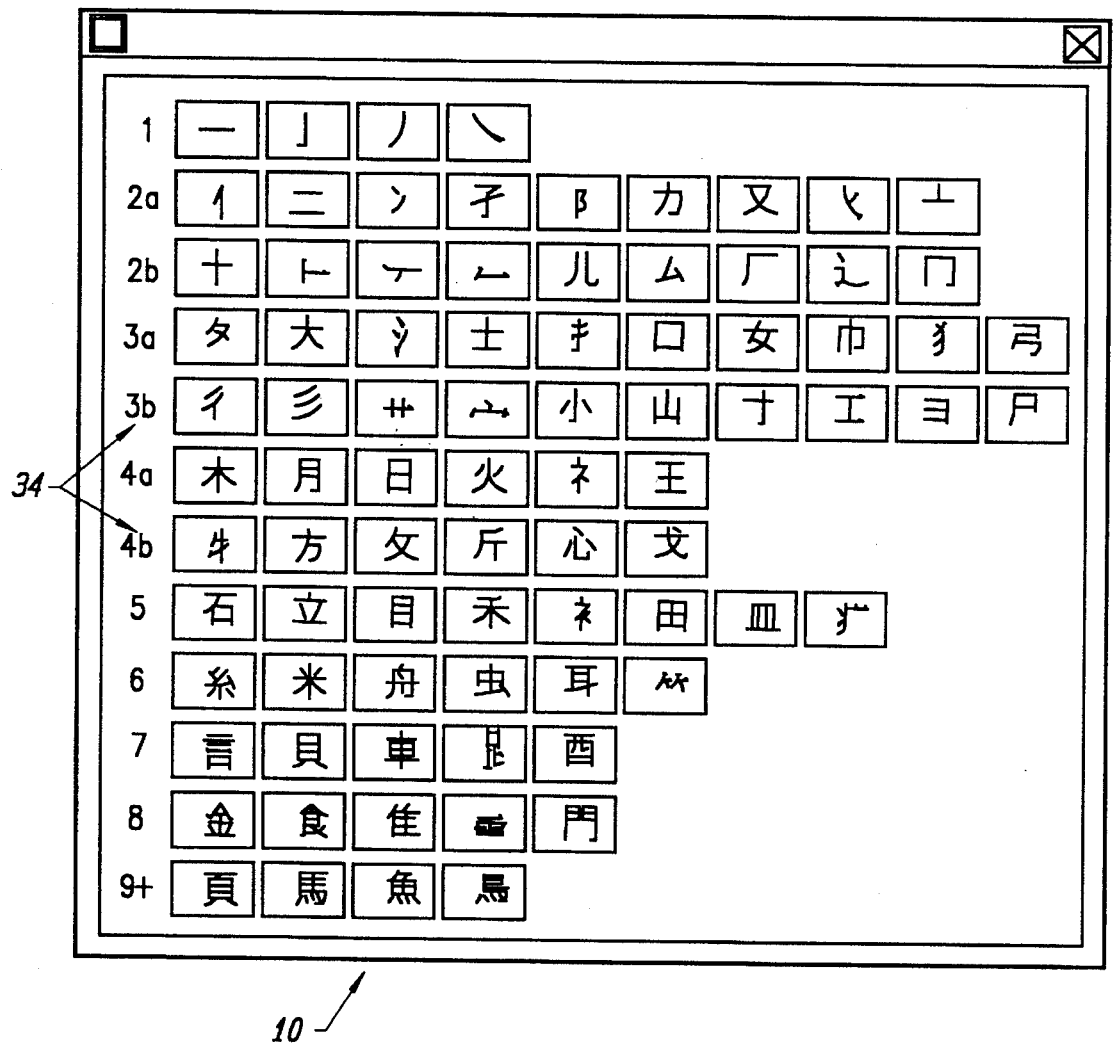
FIG. 5 shows a kanji palette as it appears on a display screen according to the preferred embodiment of the present invention.

The palette 10 is shown in FIG. 5 as it appears on the display screen, and consists of 82 radicals arranged by number of strokes (i.e. 1 to 9 or more strokes, as shown in the column at the far left side of the palette, as indicated by numeric designator 34). A stroke is traditionally defined to be an element of an ideographic character that can be drawn with one complete motion without lifting the pen from the paper. The strokes are combined to form radicals, which are in turn combined to produce characters. The individual strokes are arranged in a matrix and each one is placed in a separate area known as a cell. The palette display is constructed programmatically on the screen by reading in image data from external image datafiles. These images are rendered in the individual cells and are iconic representations of the data that is present in the ideographic database.

The palette is designed to be easily customized for any number of ideographic languages, e.g. Japanese, Korean, traditional Chinese, or simplified Chinese. This is done by updating the external image datafiles with the new images for the desired language. With reference to FIG. 4, it can be seen that the invention includes an ideographic description database 30 in the backend processor 22.

The database 30 may be provided as a software module that is readily exchanged with another module, should a different ideographic alphabet be desired. Additionally, several such modules may be provided and the invention may include a selection menu for choosing between any of the several database modules. In this way, one may have several ideographic alphabets available for reference at any given time. This gives the invention a great deal of flexibility in its implementation across a variety of ideographic languages. It is also easy to add images to the database should it become necessary to update the ideographic database. For example, the database 30 may be provided on CD-ROM. Updating the database in such application only requires replacing the current CD media with a new, updated CD media.

Figure 6:
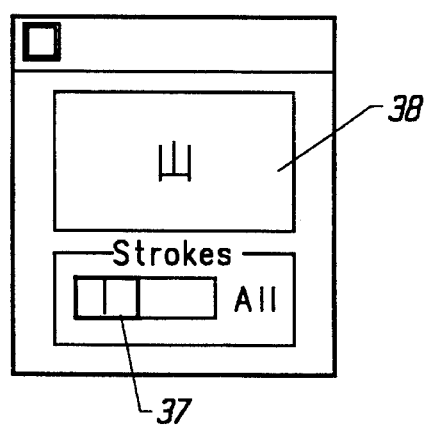
FIG. 6 shows a canvas as it appears on a display screen according to the preferred embodiment of the present invention.

The canvas 12 is shown in FIG. 6 and consists of an open area 38 on which radicals can be dragged during the construction of a character. At the bottom of the canvas is an area where filters are set 37 (e.g. number of strokes). The filters specify parameters to constrain the search.

The canvas may be divided into areas known as sectors. The preferred embodiment of the invention uses a canvas consisting of nine sectors, however, the invention is not limited to the use of greater or fewer sectors in other embodiments. The sectors in the current embodiment are known by the names: upper left, middle left, lower left, upper middle, middle middle, lower middle, upper right, middle right, and lower right. These names are suggestive of and describe their relative locations on the canvas as shown in the figure. Dragging a radical from the palette 10 onto the canvas 12, for example using a mouse, followed by optional translation and resizing, places the radical in one or more of these sectors.

The invention may be used to scale the resultant character in such a way as to minimize the dependence on absolute position of the radicals. Thus, one using the invention is not required to be practiced in the use of the mouse or in the placement of the radical on the canvas. The analysis algorithm (described below) converts the location of the radicals from on-screen coordinates to relative coordinates within the bounding box of the character. This gives the user a significant degree of flexibility in positioning the radicals on the canvas, without having concern for the absolute placement of the radicals within or spanning particular sectors. Thus, the invention allows the provision of a virtual canvas in which radicals are self registered.

Figure 7:
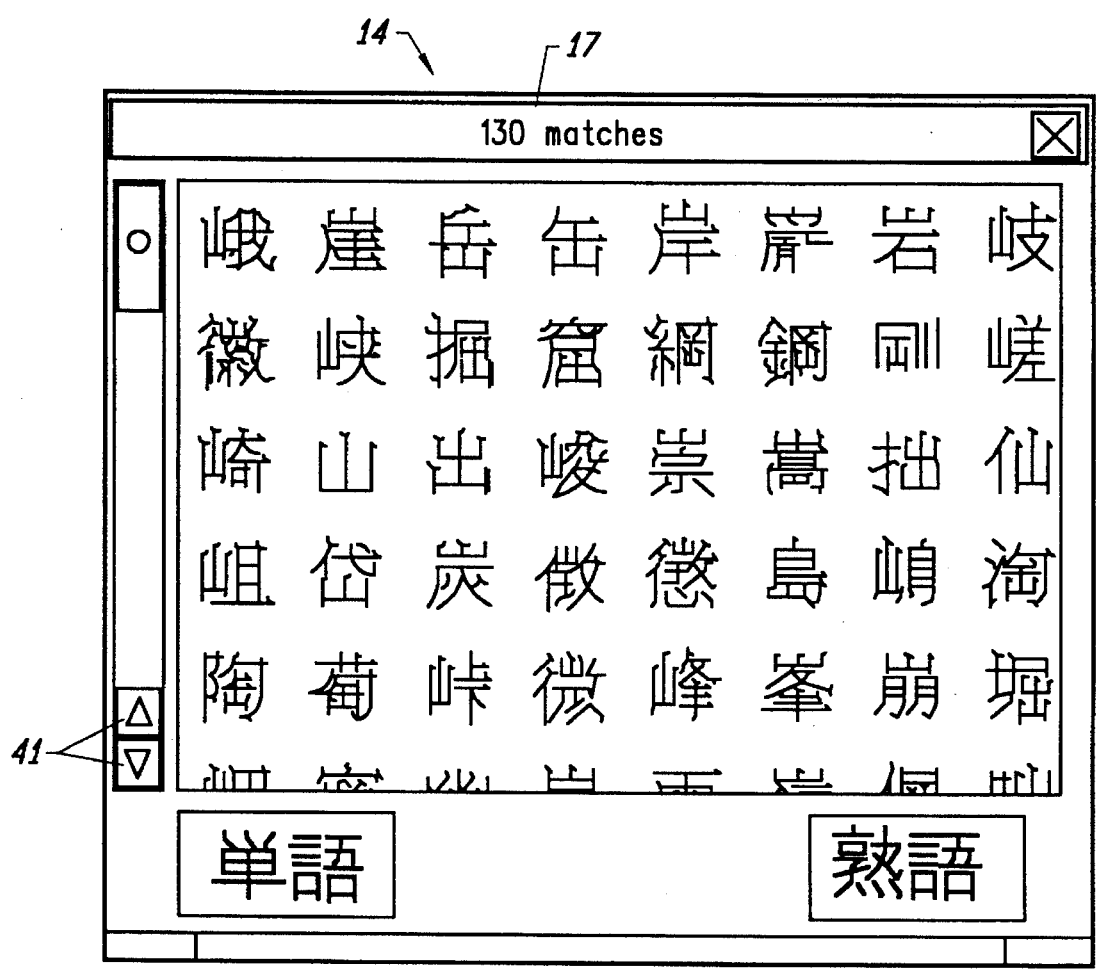
FIG. 7 shows a selection window as it appears on a display screen according to the preferred embodiment of the present invention.

The selection window 14, shown in FIG. 7, consists of a scrollable display of ideographic characters that match the character composed by the user on the canvas 12, as constrained by any selected filters. The selection window 14 is dynamically updated as the user changes the appearance of the character on the canvas through the operations of dragging, translation, and resizing the radicals. An indicator 17 shows the number of matches to the character currently displayed on the canvas. Once the user finds the desired character in the selection window, selecting it with a pointing device, such as a mouse, outputs a unique character code. In the event several character matches are found, such that the selection window is not large enough to display all of such matches, a slider or button 41 may be used to scroll the matched characters through the selection window. The output code produced as a result of user character selection can be used to input the character into an ideographic word processor or other program.

Figure 8:
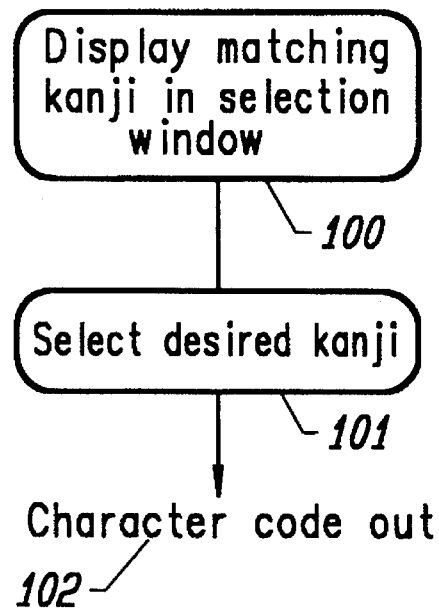
FIG. 8 is a flow diagram showing a selection window matching and output sequence according to the preferred embodiment of the present invention.

FIG. 8 is a flow diagram showing a selection window matching and output sequence according to the preferred embodiment of the present invention. A key feature of the invention is its ability to provide rapid feedback for the user as the character is manipulated on the canvas. This makes the invention an ideal tool for learning ideographic languages. Thus, matching kanji are displayed in the selection window (100) and a user selects the desired kanji (101), producing a selected character code output (102) which may be used for subsequent processing.

For the following discussion, reference should be had to FIG. 4. The window server and event handler 20 provide the connection between the user's actions on screen and the running program. Specifically, mouse events are received from a mouse 25, via a connection 23. These functional units send such mouse events to the backend processor 22, via a connection 27, as radicals are being manipulated on the display screen 24. Such manipulation may be in response to data provided to the user environment 18 via a connection 21. This system architecture permits the invention to keep track of the position of radicals, which is an essential part of the character analysis process.

The analysis engine 26 is a key element of the invention. It analyzes the onscreen radical display together with the attribute filters and outputs a set of ideographic characters that match the given constraints. The analysis engine is configured to recognize partial characters from a minimum combination of character radicals and thus allows selection of an earliest possible match of partial characters formed on the canvas with characters within the character database. The database engine 28 operates in conjunction with the analysis engine and selects characters from within the database to generate a match with a character formed on the canvas.

Figure 9:
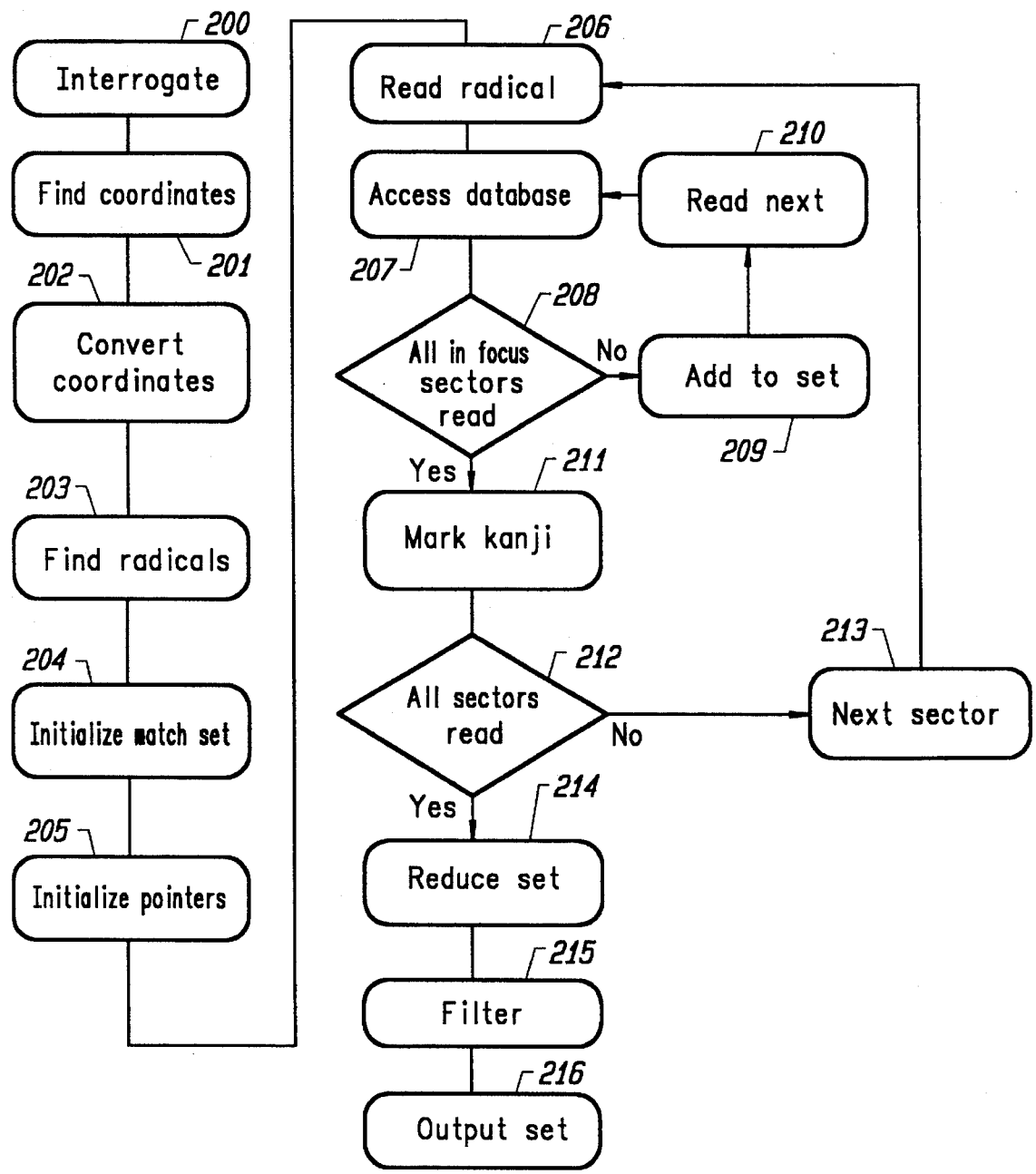
FIG. 9 is a flow diagram showing operation of the analysis engine according to the preferred embodiment of the present invention.

FIG. 9 is a flowchart of the main functions through the analysis engine. These functions are described in some detail below.

Interrogate the Canvas (200)

During the dragging and manipulation of radicals on the canvas, the window server and event handler pass radical and position information to the running program. The information is collected in a data structure and saved for later reference. This first step reads this data structure to determine:

∞the radicals that were drawn on the canvas; and

∞the location of those radicals as given by absolute sector number on the canvas.

Determine the composed character's bounding box (bbox) (201)

Once the radicals and their locations are known, the bounding box of the composed character is determined. The bounding box is often different from the frame of the canvas because the user may position the radicals nonuniformly on the canvas. For example, a character could be constructed off-center such that the locations need to be translated before performing a character analysis.

Convert from on screen coordinates to bbox coordinates (202)

This step allows the radicals to be properly positioned within the bounding box. This step corrects for any nonuniformities in the positions of the radicals.

Determine the location of each radical within the bbox sectors (203)

Once the coordinates are known, each sector (the current embodiment having nine sectors) is tested for the presence of a radical and this information is gathered in an array.

Set match set to empty (204)

This is an initialization step that clears the match set that contains the matching characters. During the analysis, characters that match the criteria are added to the set. At the end of the analysis, the match set contains the entire collection of characters matching the on canvas attributes.

Initialize primary sector tag and pointer (205)

In this step, the primary sector tag and pointer are reset to point to the first sector. These variables indicate the sector within the bounding box that is currently being examined. The primary sector is distinguished from the in-focus sector.

Read radical id(s) from next (first) sector (206)

Here, one or more radical ids are obtained by querying the current sector. These ids indicate which radicals are actually appearing on the canvas in that sector.

Access database with (id, sector) and return set of matching kanji (207)

In this step, the database is accessed with the radical id and sector number (position information). The database engine performs a search and returns a list of all kanji having the radical in the specified position.

In-focus (inner) loop (208, 209, 210)

The in-focus loop allows user control over the degree of granularity in the analysis. If focus is set to narrow, only those kanji whose radicals occupy the exact sectors on the canvas are included as candidates. As focus is set wider, kanji are also included that have radicals occupying sectors adjacent to those specified on the canvas. This allows the match set to expand to include kanji that closely, but not exactly, match the composed character on the canvas. Focus is a user feature that is used to compensate for misregistered or misaligned kanji.

Mark all kanji in current set with primary sector tag (211)

This is an intermediate step used to grade individual kanji for the degree to which they match all the criteria. Once the composite set is generated, it is later reduced according to how completely the criteria have been satisfied.

Primary sector (outer) loop (212.213)

The outer loop is executed until all sectors have been examined and the composite set of matching kanji has been generated.

Reduce match set (214)

In this step, kanji that have too low of a grade (match an insufficient number of criteria) are removed from the set. The resulting set contains all kanji that have attributes that match that of the character composed on the canvas.

Apply attribute filter(s) to match set (215)

The final match set is further reduced according to the filter(s) set by the user (e.g. total number of strokes)

Output match set (216)

Finally, the set of matching kanji is output by the analysis engine for display in the selection window.

Figure 10:
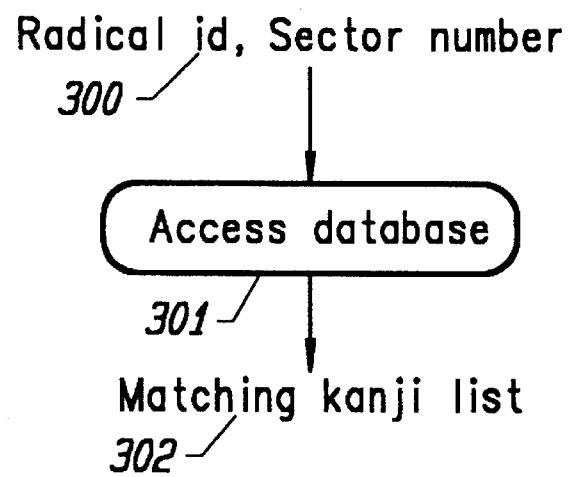
FIG. 10 is a flow diagram showing operation of the database engine according to the preferred embodiment of the present invention.

Operation of the database engine 28 is shown in flow diagram format in FIG. 10. Given a radical id and sector number (300), the engine searches the database (301) and returns a list of character codes of kanji with the given radical in that sector (302). The database contains an index of constituent parts (radicals) of ideographic characters and is organized according to radical id and sector number. The radical id is a unique number corresponding to one of the 82 radicals. A coordinate pair (id, sector) maps into a unique entry in the database. Each entry consists of a linked list of character codes describing the kanji that match the criteria of radical and sector. It should be appreciated that although the preferred embodiment of the invention uses a database containing 82 radicals, the scope of the invention is not intended to be limited in any way to a particular set of radicals or ideographic alphabet.

The database may be provided in a format that is easily maintained and updated. To do so, one "reads" the database, for example the user can type in a character code for a given kanji causing the constituent radicals appear in their respective sectors in a window similar in appearance to the canvas. The actual character may also be displayed on-screen as well. The user can move the radicals on the canvas to new sectors if the data is incorrect. It is also possible to add or delete radicals from the canvas by dragging them from the palette or individually selecting and deleting them. In this way, the database can be updated for other ideographic languages. Together with modification of the external image files described above, the present invention may be easily tailored for other ideographic languages.

Figure 11:
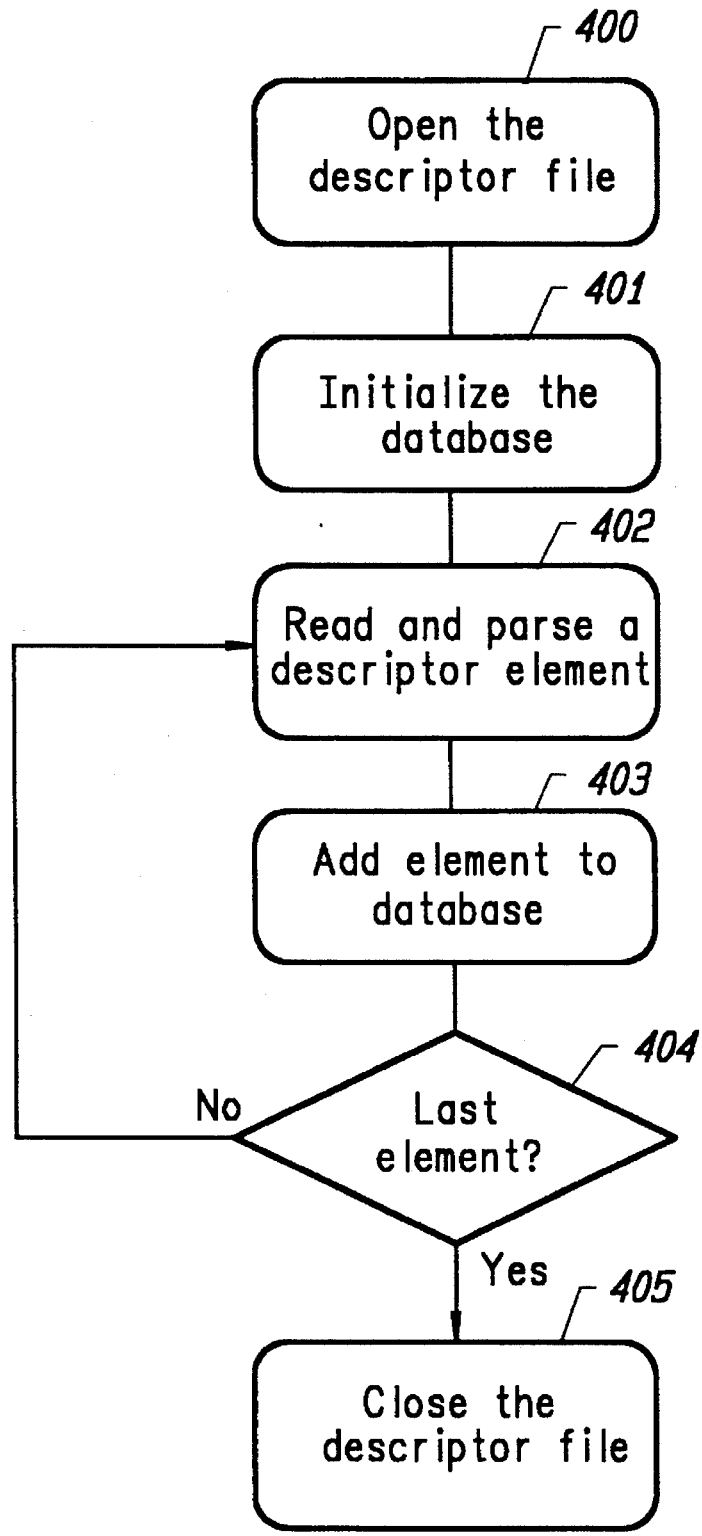
FIG. 11 is a flow diagram showing an initialization sequence of the database according to the preferred embodiment of the present invention.

FIG. 11 is a flow diagram showing the initialization steps required to prepare the database. The sequence begins when the descriptor file is opened (400). The database is initialized (401) and a loop is entered in which each descriptor element is read and parsed (402, 403). After the last element is read (404) the descriptor file is closed (405). Thus, raw data contained in an external file is read into the database during database initialization. An internal process organizes the data in a way that it can be quickly and efficiently accessed by the database engine.

Focus, Grade, and Filters

Focus and grade are aspects of the operation of the analysis engine. They are user preference adjustments that control how closely the invention matches the given criteria.

Focus allows the user to control the degree of granularity of the analysis. Focus can be varied in steps from narrow to wide. If focus is set to narrow, only kanji whose radicals occupy the exact sectors on the canvas are included in the matching set shown in the selection window. As focus is set wider, additional kanji are included that have radicals occupying sectors adjacent to those specified on the canvas. This allows the match set to expand to include kanji that closely, but not exactly, match the composed character on the canvas. This allows the invention to compensate for misregistered or misaligned kanji.

Grade is a metric that is used internally to judge whether a particular kanji should be included in the match set by the analysis engine. A kanji is graded according to how closely it matches the character drawn on the canvas. For example, if three radicals are drawn on the canvas, a kanji containing all three radicals in the proper positions will receive a higher grade than one containing only two. The grade threshold can be set by the user to control how stringently a kanji is required to match the canvas criteria before being included in the match set.

Filters are attributes that further constrain the search. In the current embodiment, stroke count is the only filter that is implemented but nothing in this invention precludes the inclusion of additional filters according to the implementation. The total number of strokes can be set by the user as shown in FIG. 6.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A computer-based symbol recognition system, comprising:

a symbol database stored in said computer, wherein each symbol of said symbol database is a member of an ideographic alphabet;

graphical display means in communication with said computer for displaying a symbol radical palette, and for displaying a canvas upon which characters are formed without regard to a point within the character at which formation is commenced or a sequence of character assembly;

means for selecting symbol radicals from said symbol radical palette, and for building symbols by graphically manipulating and combining said symbol radicals at any desired starting point and in any desired sequence on said canvas;

a database engine for recognizing partial symbols formed from combinations of symbol radicals on said canvas and for matching said partial symbols with symbols found within said symbol database; and means for representing those symbols that are found within said symbol database which match said partial symbols;

wherein said matching performed by said database engine is constrained by at least one of the following parameters:

a focus parameter defining how close radicals must be to their correct positions in order to indicate a match; and a grade parameter defining the number of radicals which must be present in their correct positions in order to indicate a match.

2. The system of claim 1, further comprising:

means for outputting recognized symbols as data for subsequent processing.

3. The system of claim 1, wherein said selecting means is a pointing device.

4. An apparatus for building, manipulating, and recognizing complex characters, comprising:

a symbol database for encoding a graphical representation of each symbol in a symbol set, wherein said symbols comprise an ideographic alphabet;

means for graphically displaying a symbol radical palette providing a user selectable set of symbol radicals, each symbol radical providing a discrete character element formed from a plurality of strokes;

means for graphically displaying a canvas upon which characters are formed without regard to a point within the character at which formation is commenced or a sequence of character assembly;

means for selecting symbol radicals from said symbol radical palette, and for building symbols by graphically combining and manipulating said symbol radicals at any desired location and in any desired sequence on said canvas;

a database engine for recognizing partial symbols formed from combinations of symbol radicals on said canvas and for matching said partial symbols with symbols found within said symbol database;

an analysis engine for correlating images of symbols formed upon said canvas with symbol database symbols selected by said database engine to generate a set of symbols that most nearly match the symbol formed on the canvas; and means for choosing and displaying a desired symbol from said set of most nearly matching symbols;

wherein said matching performed by said database engine is constrained by at least one of the following parameters;

a focus parameter defining how close radicals must be to their correct positions in order to indicate a match; and a grade parameter defining the number of radicals which must be present in their correct positions in order to indicate a match.

5. The apparatus of claim 4, further comprising:

means for outputting recognized symbols as a data stream for subsequent processing.

6. The apparatus of claim 4, wherein said selecting means is a pointing device.

7. The apparatus of claim 4, further comprising:

a window server and event handler for graphical manipulation of said radicals on said canvas; and a selection window for representing a list of symbols that most nearly match the symbol formed on the canvas.

8. The apparatus of claim 7, further comprising:

a plurality of ideographic description databases that provide representations of a plurality of different symbol sets; and means for selecting the ideographic description database that provides a desired symbol set from among said plurality of ideographic description databases.

9. The apparatus of claim 7, further comprising:

a filter for constraining a match search by a preselected parameter.

10. The apparatus of claim 9, wherein said filter parameter is stroke count.

11. A computer-based method for building, manipulating, and recognizing complex symbols, comprising the steps of:

encoding a graphical representation of each symbol in an ideographic alphabet symbol set database stored in said computer;

providing a graphical display means in communication with said computer for displaying a symbol radical palette containing a user selectable set of symbol radicals, each radical providing a discrete symbol element formed from a plurality of strokes, and for displaying a canvas upon which characters are formed without regard to a point within the character at which formation is commenced or a sequence of character assembly;

selecting symbol radicals from said palette;

building symbols by graphically combining and manipulating said symbol radicals on said canvas;

selecting symbols from within said database to generate a match with a symbol formed on said canvas;

correlating images of symbols formed upon said canvas with selected symbol database symbols to generate a set of characters that most nearly match the character formed on the canvas;

constraining said correlating and matching step is by at least one of the following parameters:

a focus parameter defining now close radicals must be to their correct positions in order to indicate a match; and a grade parameter defining the number of radicals which must be present in their correct positions in order to indicate a match;

choosing and displaying a desired symbol from said set of most nearly matching symbols; and outputting recognized symbols as a data stream for subsequent processing.

12. The method of claim 11, wherein selected symbol radicals are automatically registered to said canvas.

13. The method of claim 11, further comprising the step of:

selecting a desired database from among a plurality of databases that provide representations of a plurality of different symbol sets.

14. The method of claim 11, further comprising the step of:

constraining a match search by a preselected filter parameter, wherein said filter parameter is stroke count.

* * * * *